(12) United States Patent
Brunheroto et al.

(10) Patent No.: US 6,654,389 B1
(45) Date of Patent: Nov. 25, 2003

(54) SYSTEM AND METHOD FOR SEARCHING PATTERNS IN REAL-TIME OVER A SHARED MEDIA

(75) Inventors: Jose R. Brunheroto, Hawthorne, NY (US); Frans Laemen, Ossining, NY (US); Julio Nogima, White Plains, NY (US); Frank A. Schaffa, Hartsdale, NY (US); William J. Anzick, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/447,633

(22) Filed: Nov. 23, 1999

(51) Int. Cl.⁷ .................................................. H04J 3/04
(52) U.S. Cl. ....................... 370/535; 370/498; 370/537; 370/542; 348/385.1; 375/240.26
(58) Field of Search .................................. 370/229, 230, 370/235, 469–476, 498, 503, 506, 509–514, 535, 537, 540, 542; 375/240.26, 240.28; 348/425.1, 423.1, 385.1, 422.1, 388.1

(56) References Cited

U.S. PATENT DOCUMENTS

| 5,727,036 | A | | 3/1998 | Maertens |
| 5,734,429 | A | | 3/1998 | Jung |
| 5,742,361 | A | * | 4/1998 | Nakase et al. .......... 375/240.26 |
| 5,841,472 | A | * | 11/1998 | Rim et al. .............. 375/240.25 |
| 5,856,973 | A | * | 1/1999 | Thompson ................... 370/389 |
| 6,157,673 | A | * | 12/2000 | Cuccia ........................ 375/240 |
| 6,275,507 | B1 | * | 8/2001 | Anderson et al. ........... 370/487 |
| 6,373,898 | B1 | * | 4/2002 | Langer et al. ......... 375/240.23 |
| 6,434,170 | B1 | * | 8/2002 | Movshovich et al. ....... 370/536 |

* cited by examiner

*Primary Examiner*—Rick Ngo
*Assistant Examiner*—Thomas E. Volper
(74) *Attorney, Agent, or Firm*—Scully, Scott, Murphy & Presser; Douglas W. Cameron, Esq.

(57) ABSTRACT

A system and method for enabling real-time searching of patterns over a shared media including the capability of simultaneously searching multiple logical streams over the shared media. Patterns found are reported to the host system using some pre-assigned messages. One particular application of this invention is to search an MPEG-2 program stream, indicating the points (e.g., start-codes) where a new picture starts.

25 Claims, 5 Drawing Sheets

SYSTEM AND METHOD FOR SEARCHING PATTERNS IN REAL-TIME OVER A SHARED MEDIA

BACKGROUND OF THE INVENTION

1. Field of the Invention

The present invention relates generally to systems and methods for multiplexing data streams, and particularly, to a system and method enabling simultaneous real-time pattern searching of multiple logical streams communicated over a shared media.

2. Discussion of the Prior Art

The MPEG-2 Generic Coding of Moving Pictures and Associated Audio: Systems Recommendation H.222.0 ISO/IEC 13818-1 defines the mechanisms for combining, or multiplexing, several types of multimedia information into one program stream. This standard uses a known method of multiplexing, called packet multiplexing, where data, video and audio packets, etc. are interleaved one after other onto a single MPEG-2 transport stream (TS). The individual streams comprising the data, video and audio packets absent system or timing data are called elementary streams. The Packetized Elementary Streams (PES's) are elementary streams comprising all the header and data required to enable decoding of the elementary stream associated with a programs and may be up to 64 kbytes in length.

Transport Streams (TS's) are defined for transmission networks and allow for the multiplexing of many Packetized Elementary Streams which are packetized into smaller fixed length size, e.g., 188 bytes. These TS's additionally may suffer from occasional transmission errors. Each TS packet consists of a TS Header, followed optionally by ancillary data called Adaptation Field, followed typically by some or all the data from one PES packet. The TS Header consists of a>$Sync_{13}$ byte (0×47), flags, indicators, a Packet Identifier (PID), plus other information used for error detection, timing, etc. The semantics for the MPEG-2 TS header are as follows:

Sync_byte: (8-bits) a fixed value 0×47.

Transport_error_indicator: (1-bit) Indicates an uncorrectable bit error exists in the current TS packet.

Payload $unit_{13}$ $start_{13}$ indicator: (1-bit) indicates the presence of a new PES packet or a new TS-PSI Section. PSI—Program Specific Information.

Transport_priority: (1-bit) indicates a higher priority than other packets.

PID: (13-bits) Values 0 and 1 are pre-assigned, while values 2 to 15 are reserved. Values 0×0010 to 0×1 FFE, may be assigned by the Program Specific Information (PSI). Value 0×1 FFF is used for Null packets.

$Transport_{13}$ scrambling control: (2-bits) indicates the scrambling mode of the packet payload.

Adaptation_field_control: (2-bits) indicates the presence of adaptation field or payload.

Continuity_counter: (4-bits) One continuity counter per PID. It increments with each non-repeated TS packet having the correspondent PID.

Each MPEG-2 program stream may be characterized as a data stream that is encapsulated using MPEG-2 TS packets, with each packet containing a header field with a packet identifier (PID). The PID field is particularly used by an MPEG-2 transport demultiplexor ("Demux") to tune to a particular set of PID's that correspond to a given program stream. Each program stream must have a set of distinct PID's (except for PID=0×1 FFF for the Null packet).

For example:

program stream 1: <video PID=0×101, audio PID=0×102, secondary audio PID=0×107, 0×1 FFF> valid program stream 2: <video PID=0×101, audio PID=0×200, private data PID=0×107, 0×1 FFF> valid For a typical MPEG-2 transport stream multiplexer, several program streams, originating from different sources (e.g., network interface, or local storage sub-system), are routed over a shared data bus (i.e., a local bus) and stored in a local packet memory. Finally, packets are removed from the packet memory and transmitted over the output channel.

It would be highly desirable to provide for MPEG-2 applications, a mechanism for monitoring the data transfer over the local bus, by parsing the MPEG-2 Transport Layer, removing MPEG-2 TS header and adaptation fields, and searching the payload field, for a specific pattern (e.g., a start code "0×000001").

U.S. Pat. No. 5,734,429 describes an apparatus for detecting start code for bit stream of compressed image according to the MPEG-standard. The disclosed apparatus however, can only handle the case where only one bit stream is present. Similarly, U.S. Pat. No. 5,727,036 describes a method for searching start code for high bit rate but only covers the case where only one bit stream is present.

It would be desirable to provide a mechanism that searches for patterns in a multi-program multiplexed stream, in real-time, and moreover, that searches in parallel several bit streams that are multiplexed and transmitted over a shared media (bus, network, etc.).

It would be additionally desirable to provide a real-time search mechanism that searches for patterns in a multi-program multiplexed stream, wherein individual bit streams are transferred as buffer (burst-basis) units, and that further provides tracking and transferring of buffer unit context when a search pattern crosses a buffer boundary, i.e., when the starting part of the pattern resides in one buffer and the remainder part resides in a following buffer.

SUMMARY OF THE INVENTION

It is an object of the present invention to provide a system and method for performing real-time search of a bit pattern over a shared media supporting multiple simultaneous data streams each associated with a different program source.

It is a further object of the present invention to provide in an MPEG-2 packet Time Division Multiplexed transport system, a real-time data monitoring mechanism for data transfers occurring over a local bus that parses the MPEG-2 Transport Layer, removes MPEG-2 Transport Stream header and adaptation fields, searches the payload field for a specific pattern, and, identifies and indexes points where the search patterns occur.

It is yet another object of the present invention to provide in an MPEG-2 packet transport system, a real-time data monitoring and pattern searching system that additionally tracks all the individual bit streams at a given time, and performs context switching in a transfer unit (burst) basis.

According to the principles of the invention, there is provided a system and method for providing real-time searching and indexing of patterns included in packets of a packet stream over a time-domain multiplexed shared media (e.g., local bus, local area network, etc) and, particularly providing searching of several data streams transmitted over this shared media using a real-time search engine. Given a set of data streams, where a data stream is characterized as a set of linked buffers (initially stored in a Packet Memory (30), for example, using a linked list data structure, and associated with a program stream using a unique identifier called the Queue Identifier (QID)), with each buffer capable of being transferred in blocks of variable block sizes over a shared media using a time-domain multiplexing (TDM) technique (e.g., one block from data stream(i) is transmitted, then one block from data stream(j) is transmitted, and so forth), the real-time search engine is enabled to: capture each individual data transfer; parse the higher level protocol that encapsulates the payload; remove the transport layer header, and perform the pattern searching in the data stream payload. In the event of a pattern being found, the Real-Time Search Engine (100) generates a special status message containing the offset within the packet payload, the location within the associated buffer, and the contents of the packet following the location of the search pattern.

This search is performed in real-time (as the blocks traverse the media), and the search results are reported to a host processor using one or more pre-defined messages. Additionally, as a pattern can cross a buffer boundary, i.e., the starting part of the pattern may reside in one buffer and the remainder part may reside in the subsequent buffer, additional complexity is introduced. The Real-Time Search Engine addresses this complexity by performing a context switching operation which includes: capturing each individual data transfer; mapping a start data transfer address and a data stream identifier (QID) using a buffer number as the key; saving the current contents of a Context Register into an SRAM Context Storage (107); fetching the context corresponding to the new data stream (using the Buffer number as the key); and, copying its contents into the Context Register (105). Once the appropriate context is fetched, the Real-Time Search Engine continues parsing the data stream.

Advantageously, the real-time pattern searching method and system of the invention may be implemented in any transport packet scheme, e.g., IP, ATM, where one or more a data streams are transmitted over a shared media using a time domain multiplexing technique.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
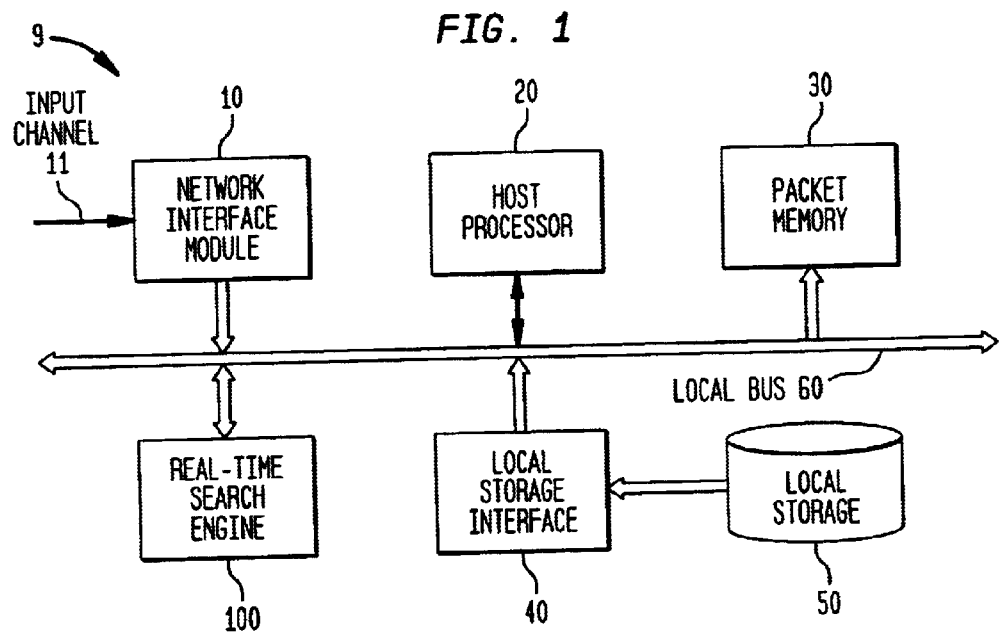
FIG. 1 is a diagram illustrating the connection of the Real-Time Search Engine (100) with the Host Sub-System.

FIG. 1 is a block diagram illustrating a preferred implementation of the Real-time Pattern Searching System (9) of the invention. As shown in FIG. 1, MPEG-2 program streams may be originated from a network connection (10) or from a local storage device (50). In any case, the streams contents are transmitted in blocks which are written into a Packet Memory (30) in a manner that facilitates re-assembly of the original MPEG-2 program stream contents. Particularly, as shown in FIG. 1, there is provided an input channel (11) from where an MPEG-2 Program Stream originates via a Network Interface Module (10) that processes and generates the MPEG-2 data streams for temporary storage in the Packet Memory storage device (30). Although not shown, there may be further implemented an MPEG-2 Transport stream demultiplexor (Demux) block which demultiplexes individual MPEG-2 program streams for temporary storage in a Packet Memory storage device as shown and described in commonly-owned, co-pending U.S. patent application Ser. No. 09/448,333, the contents and disclosure of which is incorporated by reference as if fully set forth herein. Alternatively, an MPEG-2 program stream may originate from a Local Storage device (50), where it is received by a Local Storage Interface (40), for processing and storage in the Packet Memory (30). In the preferred embodiment, the Packet Memory (30) is used to cache both incoming and outgoing program streams. Buffers from individual program streams are stored in the Packet Memory (30) as will be described in greater detail herein.

A Real-time Search and Indexing Engine (100) is provided that is MPEG-2 aware, and supports multiple MPEG-2 program streams that are transferred over a non-multiplexed Local Bus (60). The Real-Time Search and Indexing Engine (100) particularly monitors the data transfers into the Packet Memory device (30), (i.e., the write operations), capturing them into a Bus Interface and Caching mechanism (101), shown and described herein with respect to FIG. 2, and generates the proper indexing in the manner to be described in greater detail.

A Host Processor (20) is attached to the Local Bus (60), for controlling the operation of each of the modules connected to the Local Bus (60). That is, the Host Processor (20) attached to the local bus (60), controls the various system data flows which include: 1) data flow from the From Network Interface Module (10) to the Packet Memory (30); 2) data flow from the Local Storage Interface (40) to the Packet Memory (30); and, 3) data flow including Host Processor (20) commands to the Real-Time Search Engine (100).

Figure 2:
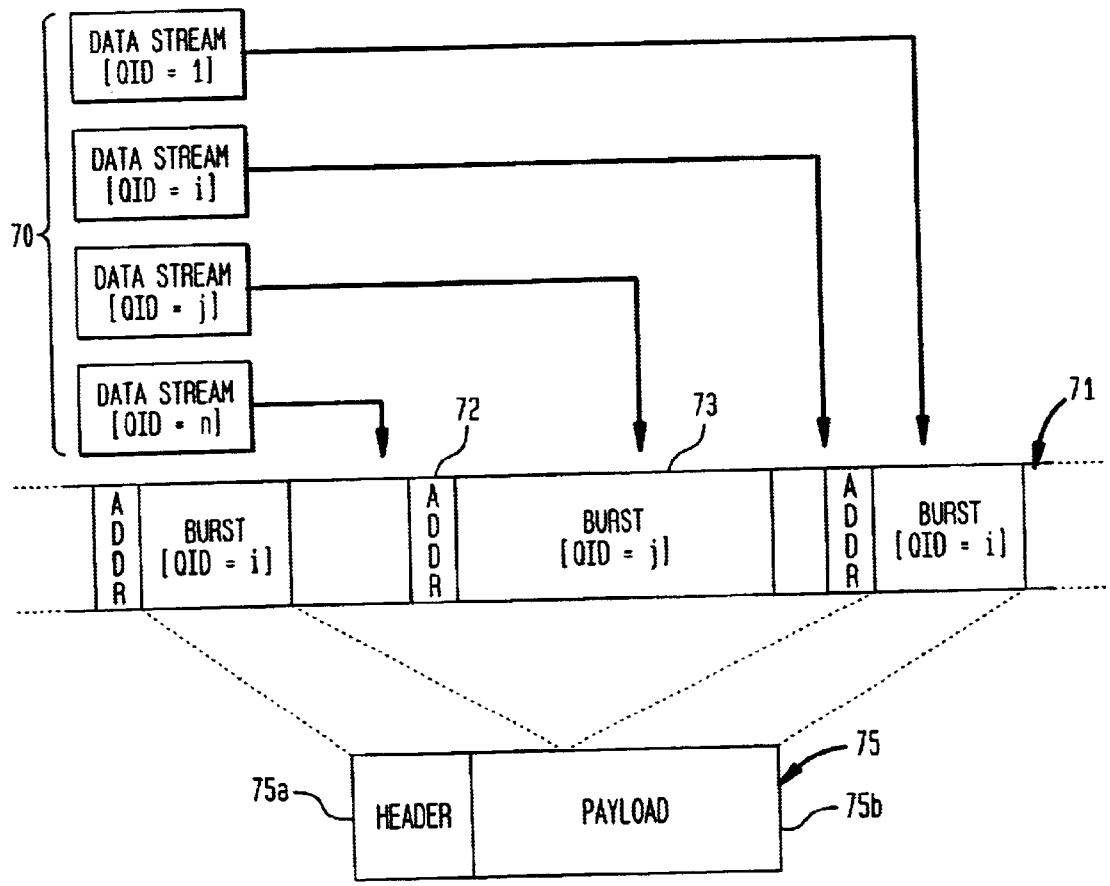
FIG. 2 illustrates an example of several data stream (70) transfers over a shared bus and the segmentation of an MPEG-2 transport packet.

FIG. 2 illustrates a logical diagram for the data flows from the individual program streams (70) that are multiplexed into a single shared transport media (71) using Time Division Multiplexing (TDM). As shown, the TDM slots (73) on the shared transport media may have variable sizes, depending on the burst size supported by the shared media (71). Typically, for a Local Bus scenario, the information residing in the header field (72) includes a "start of transfer address" (hereinafter ADDR) that suffices to associate the data transfer block with its source (QID). According to the MPEG-2 standard, the TS packet (75) includes a header (75a) having a packet identifier (PID), flags, indicators, error detection and timing information, in addition to its associated MPEG content payload (75b). As depicted in FIG. 2, each data burst associated with a QID may comprise a whole or partial TS packet (75), in the case of segmentation.

Figure 3:
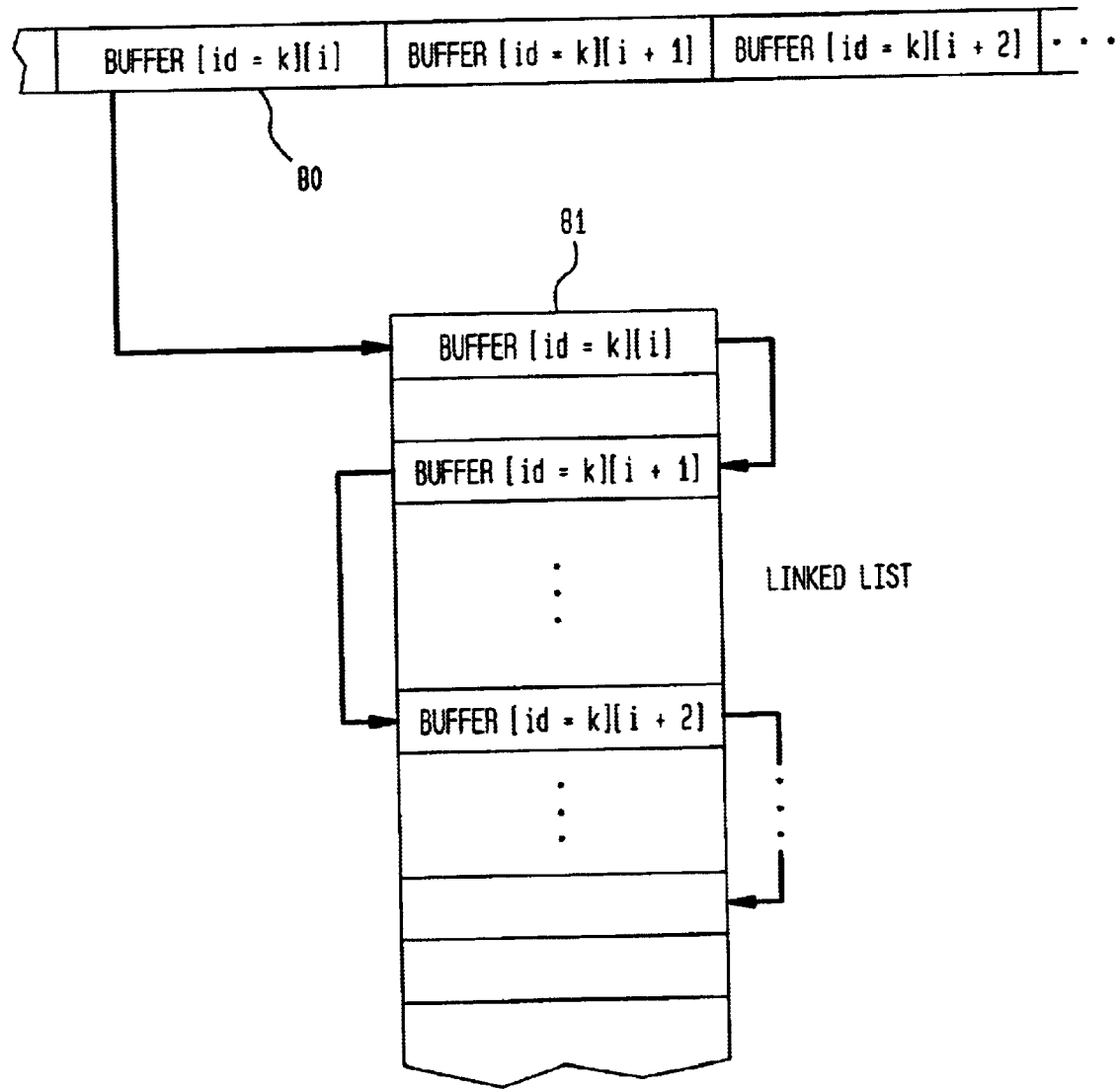
FIG. 3 illustrates the linked list data structure (81) used to store the data streams in the Packet Memory (30)

As shown in FIG. 3, for purposes of this invention, a program stream is considered a sequence of buffers (80) identifiable by an buffer id. These buffers are stored in the Packet Memory (30) using a linked list data structure (81) such as illustrated in FIG. 3 and manageable by the Host Processor (20). This buffer management scheme is advantageous as it improves memory utilization by eliminating fragmentation.

Figure 4:
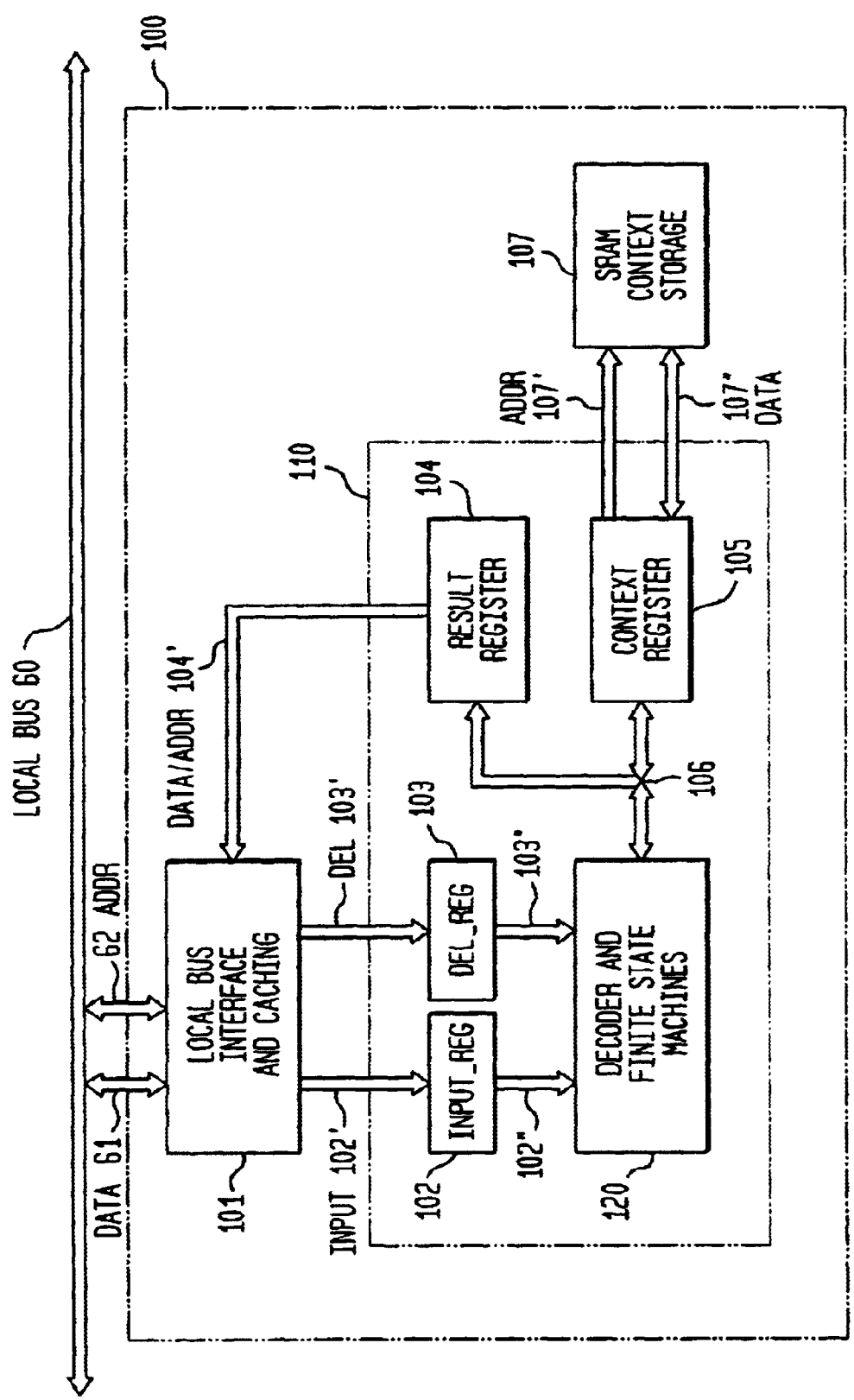
FIG. 4 is a high-level block diagram illustrating the Real-Time Search Engine (100) and its connection with the Host Sub-System Local Bus (60)

FIG. 4 is a high-level block diagram illustrating the Real-Time Search Engine (100) and its connection with the Host Sub-System Local Bus (60). As shown in FIG. 4, the Real-Time Search Engine (100) includes a local Bus Interface and Caching,(101) mechanism that captures each block written into the Packet Memory (30) via the Local Bus (60); and, a field programmable gate array (110) including: an Input Register (102) for receiving captured information routed over an INPUT bus (102') from the Bus Interface and Caching unit (101); a DEL Register (103) for receiving delimeters (DEL) used to signal start of transfer, data and control fields generated by the Bus Interface and Caching unit (101) and routed over a DEL bus (103'); a Decoder and Finite State Machine block (120) for performing all decoding and context handling functions; a Result Register (104) for reporting data/address results to the Host Processor (20) using pre-defined messages via the local Bus Interface and Caching (101) unit; and, a Context Register (105) for storing information relating to the context switching functions. Further included is the SRAM Context Switching Memory (107) for temporarily storing context information from the Context Register (105) including buffer address information (107') and data information (107"). With further regard to FIG. 4, each data transfer block (write operation into the Packet Memory (30)) routed over the non-multiplexed Local Bus (60) for capture by the Real-Time Search Engine (100), includes data and address information that is input to the Local Bus Interface and Caching block (101) via DATA bus (61) and address ADDR bus (62), respectively. The Local Bus Interface and Caching block (101) outputs include: information carried over an INPUT bus (102') for input to the Input Register (102); and, the Delimiter information having <"address", "command", or "data"> values indicating the type of information that is carried on the INPUT (102') bus via the DEL (delimiter) bus (103').

The Host Processor (20) controls the operation of the Real-Time Search Engine (100) by sending commands over the Local Bus (60) at a pre-defined address range. These commands include "Clear_Buffer", "Start_Buffer" and "Chain_Buffer" which are decoded and processed by the Decoder and Finite State Machines (120) block. Particularly, before starting the transfer of a new MPEG-2 program stream, the Host Processor (20) issues a command ("Start_Buffer") to start the Real-Time Search Engine 100). This command assigns the buffer number for the first buffer, and the Packet Identifier (PID) for which the search is to be performed. The Real-Time Search Engine (100) initializes the Context Register (105) corresponding to the new program stream, enabling the capture of data transfers associated with this program stream. For the subsequent buffers belonging to this program stream, the Host Processor (20) must issue a "Chain_Buffer" command linking the current buffer with the following buffer before data transfers associated with the next buffer start. It is understood that the "Chain_Buffer" command may be initiated any time following the "Start_Buffer" command. When a data transfer block first accesses a new buffer (one that has not been previously accessed), as it switches from the current to the next buffer, it automatically performs a "chain buffer" operation, by copying the context corresponding to the current buffer into an area in SRAM Context Storage (107) associated with the context of the next buffer. It also resets an "enable_context" flag that indicates a pending request for context switching.

More specifically, the MPEG-2 aware Real-Time Search and Indexing Engine (100) has been architected with the following capabilities: 1) capability to search a given pattern inside the MPEG-2 payload field for any given MPEG-2 program stream. Once the pattern is found, the Real-time Search Engine (100) reports the pattern location (buffer number, buffer offset, and byte position inside the MPEG-2 Transport Stream packet); 2) the capability to handle multiple program streams, dynamically switching context (each program stream has its own context), on a block (smallest transfer unit in the local bus) basis. Context switching is performed whenever a new data block is transferred from a buffer that is not the current buffer. The search engine keeps the entire context stored locally (e.g., SRAM); and, 3) the capability to report the search results by writing one or more specialized data blocks into a pre-allocated shared memory region, and utilizing a direct mapping scheme to associate the report with the buffer where the pattern was found. Specifically, once the Real-Time Search Engine (100) finds the search pattern, it reports the byte immediately following the search pattern by writing a special data transfer block containing the contents of a "Result Register" into the Packet Memory (30) as described herein with respect to FIGS. 5 and 8. The maximum number of reports per buffer is pre-assigned, however, this number may be altered by increasing the shared memory region used for reporting the search results. Preferably, the search engine (100) is implemented using FPGA's to enable system modifications without extensive re-design.

Figure 5:
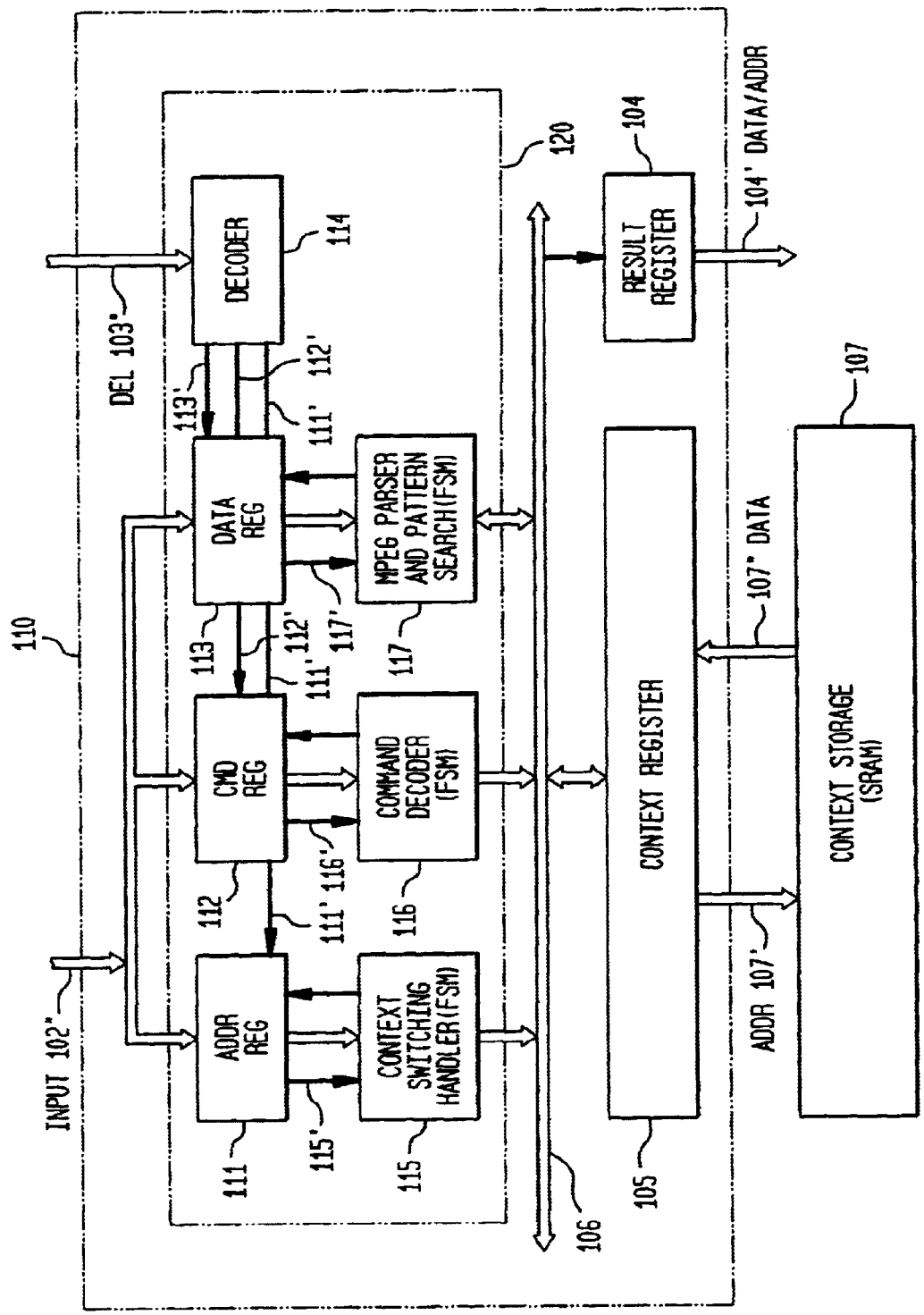
FIG. 5 is a detailed block diagram of the Real-Time Search Engine (100) according to the preferred embodiment of the invention.

FIG. 5 is a further detailed block diagram of the Real-Time Search Engine (100) and particularly, the Decode and Finite State Machine Block (120). As shown in FIG. 5, the DEL (delimiter) bus (103') carries DEL information (103") for input to a DECODER block (114) which decodes the DEL parameter information to enable routing of the INPUT information (102") into the appropriate register: ADDR REG (111), CMD REG (112), or DATA REG (113) under actual control of the corresponding control lines: (111'), (112'), and (113'). As referenced herein, these DEL values signal the following types of information: Address—indicating the starting address of the data transfer; Command—indicating the command issued by the Host Processor (20); and, Data—indicating the data transfer payload.

Figure 7:
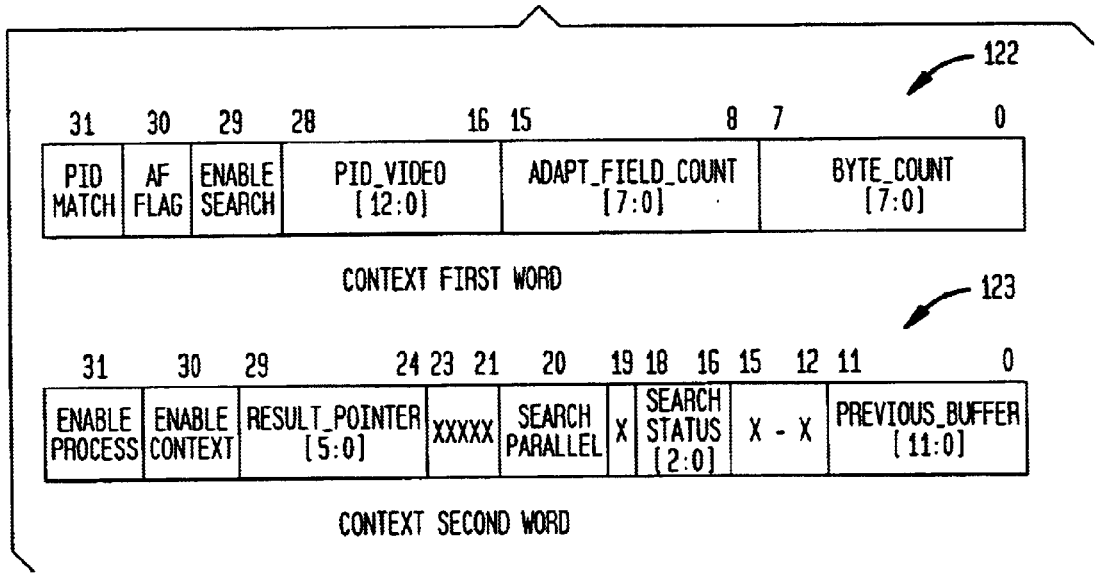
FIG. 7 illustrates the data format of the dynamic context switching registers (105)

Particularly, the ADDR REG (111) is connected to a CONTEXT SWITCHING HANDLER (115), which is a Finite State Machine that checks the contents of the ADDR REG (111), and compares it with the current buffer number stored at the Context Register (105). If the contents of the ADDR_REG (111) match the current buffer number, (indicating that the data transfer belongs to current buffer), no context switch is performed. If the CONTEXT SWITCHING HANDLER (115) determines that the current (input) address belongs to a different buffer, it saves the current context, i.e., contents of Context Register (105), in the SRAM Context Storage memory (107), and fetches the context corresponding to the new (input) buffer from the CONTEXT STORAGE (107), updating the contents of the Context Register (105). FIG. 7 illustrates the dynamic contents of the Context Register (105) as comprising a first context word (122) and a second context word (123). Particularly, as shown in FIG. 7, the first context word (122) format is as follows:

Bit 31: "pid_match" (indicating a PID match for current packet)
Bit 30: "adapt_field_flag" (indicating presence of the "adaptation_field")
Bit 29: "enable_search" (indicating that a search is enabled for this buffer)
Bits 28–16: "pid_video" (a 13-bit value)
Bits 15–8: "adapt_field_count" (an 8-bit value)
Bits 7–0: "byte_count" (an 8-bit value)

The second context word (123) format is as follows:
Bit 31: "enable_processing" (indicating that the real time engine has to process this buffer)
Bit 30: "enable_context" (indicating that the real time engine performs context switch)
Bits 29–24: "result_pointer" (a 6-bit value)
Bits 23–21: reserved
Bit 20: "search_parallel" (process 32-bits at a time)
Bit 19: reserved
Bits 18–16: "search_status" (a 3-bit value)
Bits 15–12: reserved
Bits 11–0: "previous_buffer" (a 12-bit value)

The dynamic context mechanism implemented for an example buffer transmission scheme is employed as follows: given an example transfer of a 100 megabyte file from a local storage to a MPEG-2 multiplexer unit (not shown), instead of transferring the whole 100 megabytes as one unit, it may be segmented into units, (e.g. PDU units) of 64 Kbytes, for example. However, as 64 K cannot be divided into an integral number of 188 byte MPEG-2 packets, it is the case that the segmented file splits a packet, i.e., does not end perfectly at a MPEG-2 packet boundary. Thus, there arises the need for the dynamic context to store the packet offset for the position in the packet so that when the PDU boundary is crossed it may be accurately tracked. Thus, the dynamic context mechanism described herein handles that situation of crossing a buffer boundary when the packet does not necessarily end at the boundary. Thus, as shown in FIG. 7, the dynamic context mechanism includes a "pid_video" field (13-bits) field in the first context word (122) which indicates the PID that carries the video in the current program. Bit 31 of the first context word (122) is the "pid_match" field which indicates that when a packet header is parsed and the PID therein matches the PID indicated in the "pid_video" field of the current context register (105), then the packet will be further parsed as it is a video packet. This match is a state indication and must be stored because if the particular packet is broken, it will be identified with the current packet when the next continuation is received. Bit 30 of the first context word is the "adapt_field_flag" which is provided in the MPEG-2 header field indicating the presence of or not of the adaptation field following the header (not part of the packet payload). When this flag is set, additional parsing is necessary to remove the adaptation field: first by retrieving the adaptation field count whose value is placed in the 8-bit field indicated as "adapt_field_count," and then, corresponding to the value of the "adapt_field_count" discarding the adaptation field data from the packet in byte increments. For each byte discarded, the "adapt_field_count" field count is decremented by 1 until it reaches 0 indicating full removal of the adaptation field. Only upon reaching this point, will the "adapt field_flag" be cleared, thus, indicating only the remaining presence of packet payload. The packet payload is additionally parsed in a similar fashion. That is, every time a payload byte is processed, the 8-bit "byte_count" field is incremented so that the position is kept within the packet.

The second context word (123) is used for linking and returning information. Thus, the "enable_processing" control bit 31 indicates whether or not a particular packet is to be processed, i.e., if a data stream is sent and not a video stream, then this flag indicates that the Real-Time Search Engine (100) is to be disabled for this particular type of data. The (6-bit) field "result_pointer" includes a value associated with a QID, i.e., up to 64 entries ($2^6$), that can be used to facilitate reporting of data back to the Host Processor (20). Thus, every time a pattern is found, the "result_pointer" is incremented and a write is performed to the buffer. The "search_parallel" Bit 20 is a mechanism indicating a search optimization feature that enables the processing of four words (four bytes) at a time or one byte at a time depending upon certain conditions. That is, the "search_parallel" bit indicates whether a parallel search (32 bits at a time) is being performed or, if a single search (8 bits at a time), is being performed. The 3-Bit "search_status" field basically indicates the status of a search, i.e., where a particular search is. For example, a "search_status" value of 0 means that nothing has been found; a value of 1 indicates that a single "0" has been found; a value of 2 indicates that a pattern of two consecutive 0's have been found; a value of 3 indicates that a pattern of "0x000001" has been found, and a value of 4 indicates that the result has been found. The "previous_buffer" number field is the linking pointer information that indicates when a buffer is transmitted, the Host Processor (20) knows the next buffer to be transmitted, e.g. buffer X. Thus, the "Chain_Buffer" opcode transmitted indicates that buffer X is linked to the number indicated at the "previous_buffer" field. The Real-Time Search Engine (100) uses this information so that when it detects that for the first time there is a transition on the buffer, i.e., from a previous buffer to the next buffer, and the "enable_context" flag (Bit 30) is set indicating that this is a first time transition, a "Chain Buffer" operation is performed and context associated with previous buffer is copied to the location corresponding to the next buffer, buffer X, for example. Once this transition has been made, then the "enable_context" flag is reset indicating that copying of context is not necessary as the new buffer is now being processed.

Figure 6:
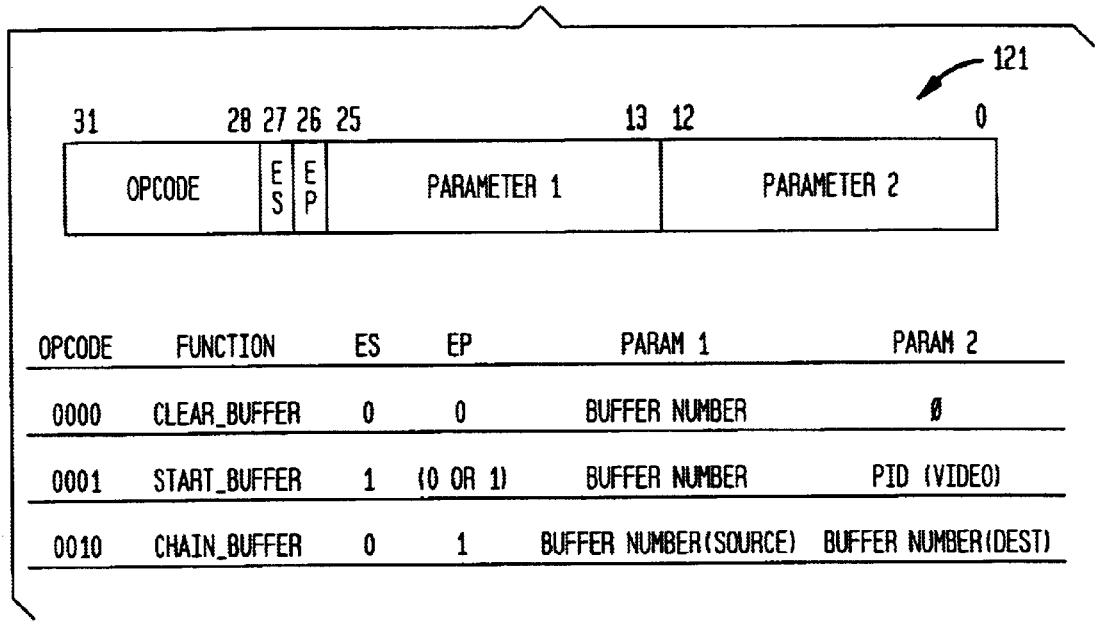
FIG. 6 illustrates the syntax for commands used to control the Real-time Search Engine (100)

Referring back to FIG. 5, the CMD REG (112) is connected to a COMMAND DECODER unit (116) which is another Finite State Machine that decodes the command opcode field comprising the "Clear_Buffer," "Start_Buffer," and "Chain_Buffer" control commands generated by the Host Processor (20) for the Real-time Search Engine (100) operation. FIG. 6 particularly illustrates the syntax and format of the commands issued by the Host Processor (20) for controlling the Real-time Search Engine. As shown in FIG. 6, the command (121) includes a unique opcode field, e.g., 4 bits, having values corresponding to the "Clear_Buffer," "Start_Buffer," and "Chain_Buffer" control function, an Enable_Search (ES) field, e.g., 1 bit, an Enable_Process (EP) field, e.g., 1 bit, and, first and second parameter fields. Thus, for example, in the issuance of a "Clear_Buffer", the first parameter indicates the buffer number and the second parameter indicates a NULL value. When a new program stream is initialized, the Host Processor(FIG. 3) issues a "Start_Buffer" op-code including a first parameter indicating the buffer number and a second parameter indicating the PID number (of video). If the opcode indicates a "Start_Buffer" command, COMMAND DECODER unit (116) saves the current context (as described above), updates the Context Register (105) with the command parameters (e.g., buffer number, PID number), and, saves its contents in the CONTEXT STORAGE (107).

All subsequent buffers must be preceded by a "Chain_Buffer", which command may be issued at anytime while the current buffer is being consumed. The "Chain_Buffer" command includes a first parameter indicating the previous buffer number. (source) and the second parameter indicates the following buffer number (destination). If the opcode indicates a "Chain_Buffer" command, the COMMAND DECODER unit (116) saves the current context (as described above), updates the Context Register (105) with the command parameters (previous buffer number, following buffer number), and saves its contents in the CONTEXT STORAGE (107).

The DATA REG (113) is connected to an MPEG PARSER AND PATTERN SEARCH unit (117) which is a Finite State Machine that parses the MPEG-2 transport layer, particularly, starting with the packet header (75a) and performing the following steps: checking for the presence of the Sync_byte (e.g., a fixed value of 0x47) and for PID matching (if the PID of the current packet matches the value of the PID to be searched); and, if no match occurs, simply discarding the remainder 184 bytes belonging to this packet; otherwise, when a match occurs, continuing parsing of the remainder fields of the packet header, parsing the 2 bits that indicate the presence of "adaptation field". If the packet contains an "adaptation field", it sets an "adapt_field_flag" to true. The MPEG PARSER AND PATTERN SEARCH unit (117) then reads the "adaptation_field_length" field, skipping the entire "adaptation field", and continues the search at the transport packet payload field. The MPEG PARSER AND PATTERN SEARCH unit (117) additionally searches for the first 24-bits of the "start code", e.g., "0x000001" pattern and reports the byte that follows it. In the preferred embodiment, as the Local Bus (60) (FIG. 4) is 32-bits wide, the search is optimized to discard 32-bit words that do not contain the search pattern. For example, if the search pattern is the first 24-bits of an MPEG-2 start code ("0x000001"), the Real-Time Search Engine (100) will discard any 32-bit word that does not contain at least one byte equals to "0x00". Other conditions may be implemented to additionally cause a discarding (e.g., a byte equal to "0x00" followed by a byte that is different from "0x01"). When the searched pattern is found, the MPEG PARSER AND PATTERN SEARCH unit (117) finally requests the RESULT REGISTER (104) to generate a data transfer into the Packet Memory (30) with contents including the result of the search, i.e., the offset within the buffer, the offset within the particular packet, and the byte following the pattern. Particularly, the MPEG PARSER AND PATTERN SEARCH (117) updates the following fields belonging to the Context Register 105: "pid_match", "adapt_field flag", "adapt_field_count", "byte_count", "result_pointer", "search_parallel", and "search_status". When the search pattern is found, it updates the "search_status" field to "0x4", copies the contents of the byte following the pattern in the payload field into the Result Register (104) "search_pattern" field, and then generates a data transfer block containing the contents of the Result Register (104). Once the transfer is complete, the "search_status" field in the Context Register (105) is cleared, the "result_pointer" field is incremented, and the pattern search resumes from the following byte.

Figure 8:
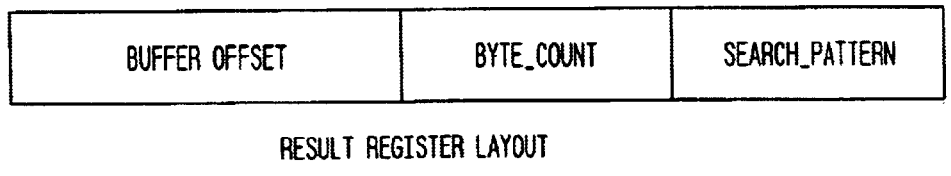
FIG. 8 illustrates the data format of the Result Register (104).

FIG. 8 illustrates the format (125) of the "Result Register" (104) which contains the indexing information generated by the Real-Time Search Engine (100) and returns the searched pattern. Particularly, as shown in FIG. 8, the indexing information includes the following fields: "buffer$_{13}$ offset" (offset within the current buffer), the "byte_count" (byte offset within the current MPEG Transport Stream packet), and the "search_pattern" (the byte that immediately followed the searched pattern). It should be understood that, in addition, the Real-Time Search and Indexing Engine (100) reports the presence of MPEG Transport Stream packets containing "adaptation field", which may be used by the Host Processor (20) for identifying which packets carry the Program Clock Reference (PCR) information, since PCR can only be presented on packets that contain the "adaptation field". Furthermore, the Real-Time Search and Indexing Engine (100) may additionally report the presence of MPEG Transport Stream packets containing a "payload_unit$_{13}$ start_indicator" flag set, which may be useful for applications, e.g., a real-time splicing application, that need to identify the start of a Program Elementary Stream (PES) packet (audio or video steams). Thus, the Real-Time Search and Indexing Engine (100) may be particularly employed as part of the real time splicing/spot insertion system as shown and described in commonly-owned, co-pending U.S. patent application Ser. No. 09/448,335 entitled SEAMLESS SPLICING/SPOT-INSERTION FOR MPEG-2 DIGITAL VIDEO/AUDIO STREAM, the contents and disclosure of which is incorporated by reference as if fully set forth herein.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by letters patent is:

1. A system for ring real-time search of a bit pattern over a shared media supporting multiple simultaneous data streams each associated with a different program source, each data stream comprising a data stream payload including a bit pattern to be searched, said system comprising:

means for receiving portions of each data stream and transferring said received data stream portions over said shared media to a first memory storage device, said data stream portions comprising program data bursts including partial transport stream packets not bound by packet boundaries;

processor means for specifying a particular program source having a bit pattern to be searched and initiating said search;

real-time search-engine means responsive to said processor means for capturing said data stream portions transferred from said shared media, searching said data stream payload for a pre-defined bit pattern in real-time, and, generating search context information relating to said search; and, means for tracking search context information for each said captured data stream portion, said search context information utilized by said real-time search-engine means for determining a location of said bit pattern within its associated data stream when said bit pattern is found.

2. The system as claimed in claim 1, wherein each said data stream portion includes an associated data stream portion number, said processor means issuing a start command for enabling tracking of search context when a new data stream portion belonging to a new data program source is transferred.

3. The system as claimed in claim 2, wherein said tracking means further includes means for storing tracked search context information for every current data stream in a second memory storage device associated with said data stream portion number.

4. The system as claimed in claim 3, wherein said tracking means further includes means for switching tracked search context information when new data stream portions associated with a prior searched program source is transferred.

5. The system as claimed in claim 4, wherein said processor means issues a chaining command for enabling said switching of tracked search context, said search context information for a new data stream including said data stream portion number of a last searched data stream portion associated with that program source.

6. The system as claimed in claim 5, wherein said real-time search engine means includes means for counting bytes searched through said data stream payload, said search context information including said number of bytes counted in said payload and said associated data stream portion number for determining said bit pattern location.

7. The system as claimed in claim 6, further including means for reporting said bit pattern location to a predetermined location in said first memory storage device when said bit pattern is found.

8. The system as claimed in claim 7, further including means for determining a bit pattern immediately following a location of said found bit pattern and reporting said immediately followed bit pattern to said predetermined memory location.

9. The system as claimed in claim 1, wherein each data stream includes a header encapsulating higher level protocol information, said real-time search engine including parsing means for removing said higher level protocol information prior to searching said data steam payload data.

10. The system as claimed in claim 9, wherein said data stream is an MPEG-2 program stream including MPEG-2 transport packets, said packets including a header encapsulating transport packet information, said parsing means further removing said transport packet information header information.

11. The system as claimed in claim 10, wherein each said MPEG-2 transport packet includes a unique identifier, said search context information for a current data stream portion including said unique packet identifier.

12. The system as claimed in claim 5, further including decoding means for receiving and decoding said start and chaining commands initiated by said processing means, said decoded commands for initiating real-time search engine searching and tracking means operation.

13. The system as claimed in claim 5, wherein said data stream portions are of variable length.

14. The system as claimed in claim 1, wherein said shared media is a non-multiplexed 32-bit data bus, said set of patterns comprising a 32-bit word.

15. A method for performing real-time search of a bit pattern over a shared media supporting multiple simultaneous data streams each associated with a different program source, each data stream comprising a data stream payload including a bit pattern to be searched, said method comprising the steps of:

receiving portions of each data stream and transferring said received data stream portions over said shared media to a memory storage device, said data stream portions comprising program data bursts including partial transport stream packets not bound by packet boundaries;

capturing said data stream portions transferred from said shared media;

searching said data stream payload for a pre-defined bit pattern in real-time and generating search context information relating to said search; and, tracking search context information for each said captured data stream portion, and utilizing said search context information to determine a location of said bit pattern within its associated data stream when said bit pattern is found.

16. The method as claimed in claim 15, wherein prior to said capturing step, a step of specifying a particular program source having a bit pattern to be searched and initiating said search by a real-time search-engine.

17. The method as claimed in claim 16, wherein each said data stream portion includes an associated data stream portion number, said step of specifying a particular program source including the step of: issuing a start command for enabling tracking of search context when a new data stream portion belonging to a new data program source is transferred.

18. The method as claimed in claim 17, wherein said tracking step further includes the step of storing tracked search context information for every current data stream in a second memory storage device associated with said data stream portion number.

19. The method as claimed in claim 18, further including the step of switching and tracking of search context when new data stream portions associated with a prior searched program source is transferred.

20. The method as claimed in claim 19, wherein said switching step includes the step of issuing a chaining command for enabling said switching of tracked search context, said search context information for a new data stream including said data stream portion number of a last searched data stream portion associated with that program source.

21. The method as claimed in claim 20, wherein said real-time searching step includes the step of counting bytes searched through said data stream payload, said search context information including said number of bytes counted in said payload and said associated data stream portion number for determining said bit pattern location.

22. The method as claimed in claim 19, further including the step of reporting said bit pattern location to a predetermined location in said memory storage device when said bit pattern is found.

23. The method as claimed in claim 22, further including the step of determining a bit pattern immediately following a location of said found bit pattern and reporting said immediately followed bit pattern to said predetermined memory location.

24. The method as claimed in claim 15, wherein each data stream includes a header encapsulating higher level protocol information, said searching step further including the step of parsing said data stream portion to remove said higher level protocol information prior to searching said data steam payload data.

25. The method as claimed in claim 20, further including the step of receiving and decoding said start and chaining commands and initiating said searching and tracking operations in response to said decoded commands.

* * * * *